US012650158B2

(12) United States Patent
Dahlberg

(10) Patent No.: US 12,650,158 B2
(45) Date of Patent: Jun. 9, 2026

(54) LINEAR ACTUATOR AND TELESCOPIC COLUMN WITH DOUBLE THREADED SPINDEL

(71) Applicant: ROL AB, Jönköping (SE)

(72) Inventor: Fredrik Dahlberg, Jönköping (SE)

(73) Assignee: ROL AB, Jonkoping (SE)

( * ) Notice: Subject to any disclaimer, the term of this patent is extended or adjusted under 35 U.S.C. 154(b) by 0 days.

(21) Appl. No.: 19/117,806

(22) PCT Filed: Sep. 21, 2023

(86) PCT No.: PCT/EP2023/076124

§ 371 (c)(1),
(2) Date: Apr. 2, 2025

(87) PCT Pub. No.: WO2024/074316

PCT Pub. Date: Apr. 11, 2024

(65) Prior Publication Data

US 2026/0117846 A1      Apr. 30, 2026

(30) Foreign Application Priority Data

Oct. 5, 2022      (EP) ..................................... 22199828

(51) Int. Cl.
*F16H 25/20*            (2006.01)
(52) U.S. Cl.
CPC ..... *F16H 25/20* (2013.01); *F16H 2025/2031* (2013.01); *F16H 2025/2059* (2013.01)
(58) Field of Classification Search
CPC ............. F16H 25/20; F16H 2025/2031; F16H 2025/2059; F16H 25/24
See application file for complete search history.

(56) References Cited

U.S. PATENT DOCUMENTS

| 5,611,508 A | 3/1997 | Palmero |
| 6,718,694 B2 | 4/2004 | Stojc et al. |

(Continued)

FOREIGN PATENT DOCUMENTS

| DE | 102012207304 A1 | 11/2013 |
| EP | 1401087 A1 | 3/2004 |

OTHER PUBLICATIONS

International Search Report, International Application No. PCT/EP2023/076124, dated Jan. 15, 2024.

*Primary Examiner* — Jake Cook
(74) *Attorney, Agent, or Firm* — Volpe Koenig

(57)            ABSTRACT

A linear actuator for height adjustable columns comprising a threaded spindle with a longitudinal extension along a longitudinal axis, the spindle being adapted to be rotated by a driving shaft, characterized in that the spindle is provided with a right-hand thread at a first portion of the longitudinal extension and a left-hand thread at a second portion of the longitudinal extension. The linear actuator further comprises one right-hand threaded nut member and one left-hand threaded nut member. At least one of the nut members comprises a first and a second part configured to be in threaded connection with the spindle on opposing sides of the spindle. The threaded connection of the right-hand and left-hand threaded nut member to the spindle provides opposite linear movement of the right-hand threaded nut member relative the left-hand threaded nut member along the longitudinal axis.

13 Claims, 6 Drawing Sheets

(56) References Cited

U.S. PATENT DOCUMENTS

| | | | |
|---|---|---|---|
| 8,967,006 B2 * | 3/2015 | Pettersson | F16M 11/08 |
| | | | 74/424.95 |
| 9,303,738 B1 * | 4/2016 | Bombardo | F16H 25/12 |
| 2010/0108843 A1 * | 5/2010 | Shaffer | F16B 37/0892 |
| | | | 248/274.1 |
| 2011/0120243 A1 | 5/2011 | Pettersson | |

* cited by examiner

LINEAR ACTUATOR AND TELESCOPIC COLUMN WITH DOUBLE THREADED SPINDEL

TECHNICAL FIELD OF INVENTION

The disclosure relates to a linear actuator for height adjustable columns and a telescopic column.

BACKGROUND

Linear actuators are used with telescopic tubes in applications like height adjustable furniture. To achieve height adjustment to a desired extent e.g. two or three telescopic tubes may be used, driven by a driving arrangement with an external threaded spindle, a both external and internal threaded spindle and a nut member. It may however be issues in terms of stability, cost efficiency and limitations to the stroke of length with such solutions. There are arrangements with fewer components, but these may as well have problems with the stability.

Consequently, there is a need for a linear actuator with improved stability and cost efficiency, at the same time as it provides a desired length of stroke.

SUMMARY

It is an object of the present invention to provide a linear actuator for height adjustable column that alleviates the mentioned drawbacks with present devices. This is achieved with a linear actuator according to the appended independent claim. Embodiments of the invention are presented in the dependent claims, as well as in the following description and drawings.

According to one aspect of the present invention there is provided a linear actuator for height adjustable columns comprising a threaded spindle with a longitudinal extension along a longitudinal axis, the spindle being adapted to be rotated by a driving shaft. The spindle is provided with a right-hand thread at a first portion of the longitudinal extension and a left-hand thread at a second portion of the longitudinal extension.

The linear actuator further comprises one right-hand threaded nut member in threaded connection with the right-hand thread of the spindle and one left-hand threaded nut member in threaded connection with the left-hand thread of the spindle. At least one of the right-hand threaded and left-hand threaded nut member comprises a first and a second part configured to be in threaded connection with the spindle on opposing sides of the spindle.

The threaded connection of the right-hand nut member and the left-hand threaded nut member to the spindle may provide opposite linear movement of the right-hand threaded nut member relative the left-hand threaded nut member along the longitudinal axis when the spindle is rotated.

The right-hand thread and left-hand thread of the spindle may be in threaded connection with the right-hand threaded and left-hand threaded nut members, respectively, such that they may be driven in opposite longitudinal directions relative each other by rotation of the spindle. The right-hand and left-hand threaded nut members may each be connected to a telescopic tube. A linear movement of two telescopic tubes may be provided in opposite longitudinal directions by rotation of the spindle. Both nut members are moved relative the spindle along the longitudinal axis between two end positions by rotation of said spindle. One of said end positions may correspond to the most extended state of the linear actuator and the other to the most contracted state of the linear actuator.

To have two parts of at least one of the left-hand and right-hand threaded nut members on opposing sides of the spindle may contribute to a high stability of the arrangement and a low risk of the nut members being bended to such extent that the operation of the linear actuator is disturbed or damaged. By opposite sides of the spindle, it may be meant opposite radial sides along the circumference of the spindle. By the first and second parts of a nut member being on opposite sides it is meant that at least a portion of a part of a nut member should be displaced 180 degrees relative at least a portion of the other of the two parts of the nut member along the circumference of the spindle. In some embodiments, substantially the whole first part of a nut member is arranged opposite to the whole second part of the nut member. Such symmetric nut member may provide a great stability to the linear actuator.

The linear actuator may be able to provide a large length of stroke since the nut members do not need to be in contact with the same portion of the spindle. The linear actuator of the present invention may be simple and have few components relative to many prior art linear actuators while still be able to support a telescopic column with three telescopic tubes. The simplicity and low number of components may contribute to the cost-efficiency of the linear actuator. Yet further, since at least one of the nut members has two parts on opposite sides of the spindle, the linear actuator may have a high level of stability in the extended state.

In one embodiment the right-hand threaded nut member may comprise a first and a second part configured to be in threaded connection with the spindle on opposing sides along the circumference of the spindle, and the left-hand threaded nut member comprises a first and a second part configured to be in threaded connection with the spindle on opposing sides along the circumference of the spindle.

For both nut members to comprise a first and a second part on opposite radial sides of the spindle may further contribute to the stability of the arrangement. The risk for both nut members to deflect from the longitudinal direction and to bend may thereby be decreased. Such embodiment, with both nut members being symmetrically arranged around the spindle, may provide a yet further increased stability of the linear actuator.

In one embodiment, the right-hand threaded nut member and the left-hand threaded nut member may extend along the same portion of the longitudinal extension of the spindle. This may be the situation in at least a contracted state of the linear actuator. The contracted state may be a most contracted state of the linear actuator. It may further be the situation in an intermediate state of the linear actuator, an intermediate state between a most contracted state and a most extended state.

In one embodiment the first part of the right-hand threaded nut member and the first part of the left-hand threaded nut member may be displaced 85-95 degrees, preferably 90 degrees along the circumference of the spindle. Moreover, the second part of the right-hand threaded nut member and the second part of the left-hand threaded nut member may be displaced 85-95 degrees, preferably 90 degrees along the circumference of the spindle.

The displacement between the first parts of the right-hand and left-hand threaded nut members may contribute to the stability of the linear actuator since the right-hand threaded and left-hand threaded nut members may provide stability in two different, substantially perpendicular, directions. The risk of bending the nut members may be lower since they may have parts on two opposite radial sides of the spindle.

In one embodiment the right-hand thread and the left-hand thread of the spindle may be separated along the longitudinal extension of the spindle.

In one embodiment the right-hand thread and the left-hand thread may be provided at opposite ends of the longitudinal extension of the spindle.

The separation between the first and second portion of the spindle, provided with a right-hand thread and a left-hand thread, respectively, may imply for the left-hand thread to be in threaded contact with the left-hand threaded nut member without being in contact with the threaded portion of the right-hand threaded nut member and vice versa. Disturbance in operation of the linear actuator because of undesired contact with oppositely threaded portions may thereby be avoided.

In some embodiments, the left-hand thread and the right-hand thread of the spindle may be separated by a non-threaded portion.

In one embodiment, the non-threaded portion may extend along at least 50% of the longitudinal extension of the spindle. In one embodiment, the non-threaded portion may extend along at least 70%, or at least 80%, of the longitudinal extension of the spindle.

In one embodiment the right-hand thread and the left-hand thread may be provided at opposite ends of the longitudinal extension of the spindle.

The right-hand thread and the left-hand thread being at opposite ends of the spindle may contribute to a large stroke length of the linear actuator since they are in threaded contact with different nut members. The displacement between the nut members may thereby be larger than if the threaded portions of the spindle would be closer to the middle of the spindle.

In one embodiment the right-hand threaded nut member may bear a first and a second portion of the circumference of the spindle and the left-hand threaded nut member may bear a third and a fourth portion of the circumference of the spindle.

The right-hand and left-hand threaded nut members bearing different portions of the circumference of the spindle may further contribute to the stability of the linear actuator since the portions of the nut members May provide stability along different portions of the circumference. The nut members may bear equally or differently large portions of the circumference of the spindle.

In one embodiment the right-hand threaded and the left-hand threaded nut member may together bear against substantially the whole circumference of the spindle.

For the portions of the nut members to bear substantially the entire circumference may be more stable than to only bear a fraction of the circumference and decrease the risk of the spindle falling out of threaded connection with any of the nut members.

In some embodiments, the parts of the nut members may be symmetrically distributed along the circumference of the spindle.

In one embodiment the spindle may be hollow, comprising a longitudinal hole extending through the spindle, and the linear actuator may further comprise a driving shaft configured to rotate the spindle, wherein the longitudinal hole and the driving shaft may be sized and shaped such that a rotation of the driving shaft provides a rotation of the spindle at the same time as the driving shaft is axially moveable relative the spindle along the longitudinal extension of the spindle.

The driving shaft may thereby be used to rotate the spindle and thereby drive the linear actuator between its contracted and extended state. The shape of the driving shaft may by engagement with the hole of the spindle keep the driving shaft rotationally fixed relative the spindle whereas the driving shaft is axially movable along the longitudinal extension of the spindle.

In one embodiment the first and second parts of the right-hand threaded nut member may be configured to be attached to each other at one end and said first and second parts may comprise opening portions configured to together form an opening for the driving shaft and the first and second parts of the left-hand threaded nut member may be configured to be attached to each other at one end and wherein said first and second parts may comprise opening portions configured to together form an opening for the driving shaft.

The attachment between the first part and second part of the left-hand threaded and the right-hand threaded nut members, respectively, may hold the portions aligned relative each other and prevent operational damages which may be caused if the parts are allowed to move relative each other. The opening formed by the opening portions of the nut member parts may allow the driving shaft to extend through said opening. The end of each nut member at which said opening is formed may be an end which when the linear actuator is in the extended state is remote from the spindle.

In one embodiment the first part and the second part of the right-hand threaded nut member may have non-threaded portions which are at least as long as the left-hand threaded portion of the spindle. Further, in one embodiment also first and second parts of the left-hand threaded nut member may have non-threaded portions at an end of the left-hand threaded nut member along its longitudinal extension which are at least as long as the right-hand threaded portion of the spindle. The non-threaded portions of the first and second parts of one or both of the right-hand and left-hand threaded nut members may extend along less than 30%, less than 20%, or less than 10% of the longitudinal extension of the respective nut member.

In one embodiment the linear actuator may further comprise a holding device wherein the internal shape of the holding device may match the external shape of the right-hand and left-hand threaded nut member and wherein the holding device may be arranged to hold the right-hand threaded nut member and the left-hand threaded nut member.

The holding device may be designed to align the nut members so as they do move linearly along the longitudinal extension of the spindle. It may further press the nut members towards the spindle and keep the nut members in threaded connection with the spindle throughout the movement between the extended and contracted states. If the nut members are moving with a slight directional offset, they may by contact with the holding device be aligned into the appropriate direction. The holding device may further protect the spindle and the nut member from external forces with potential to damage the linear actuator and its operation.

The holding device may axially engird the nut members. In the most contracted state of the spindle engird the nut members may extend entirely within the holding device whereas the nut members may extend partly longitudinally outside the holding device for more extended states of the linear actuator.

According to a second aspect of the invention there is provided a telescopic column comprising three telescopic tubes comprising a linear actuator according to any of the above described embodiments, an inner tube which is attached to the left-hand threaded nut member, a middle tube which is attached to the holding device and an outer tube which is attached to the right-hand nut member.

The telescopic column may provide height adjustment for furniture, e.g. tables. The telescopic column of the present invention may provide a more cost effective and stable solution than prior art solutions. The telescopic column may further provide the above described advantages of the linear actuator it comprises. The inner and outer tubes may by being attached to the left-hand threaded and the right-hand threaded nut members be driven by the movement of the respective nut member. Thereby they are driven by the movement of the same spindle and driving shaft. Both nut members comprising portions on opposite sides may enable a tube to be attached to nut member portions on two opposite sides of the spindle. Each of the outer and inner tube being attached to nut member portions on two opposite sides of the spindle may contribute to a stable arrangement with lower risk for bending of tubes than for prior art solutions.

BRIEF DESCRIPTION OF DRAWINGS

FIG. 2 illustrates a cross-sectional view of a linear actuator in an extended state according to one embodiment of the invention.

FIG. 3 illustrates a cross-sectional view of a linear actuator in an extended state according to one embodiment of the invention.

DETAILED DESCRIPTION

Figure 1:
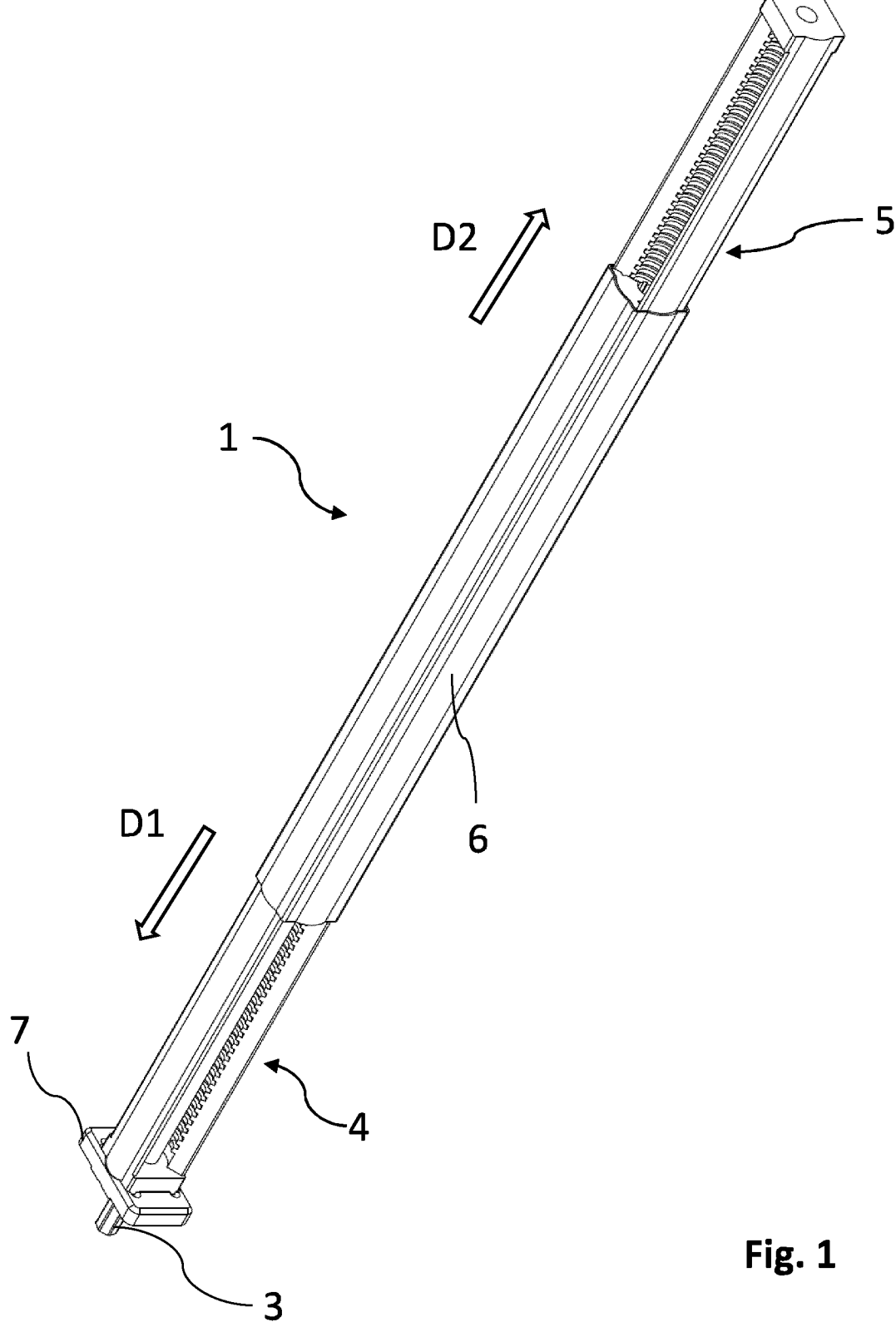
FIG. 1 illustrates a perspective view of a linear actuator in an extended state according to one embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figures 2, 3:
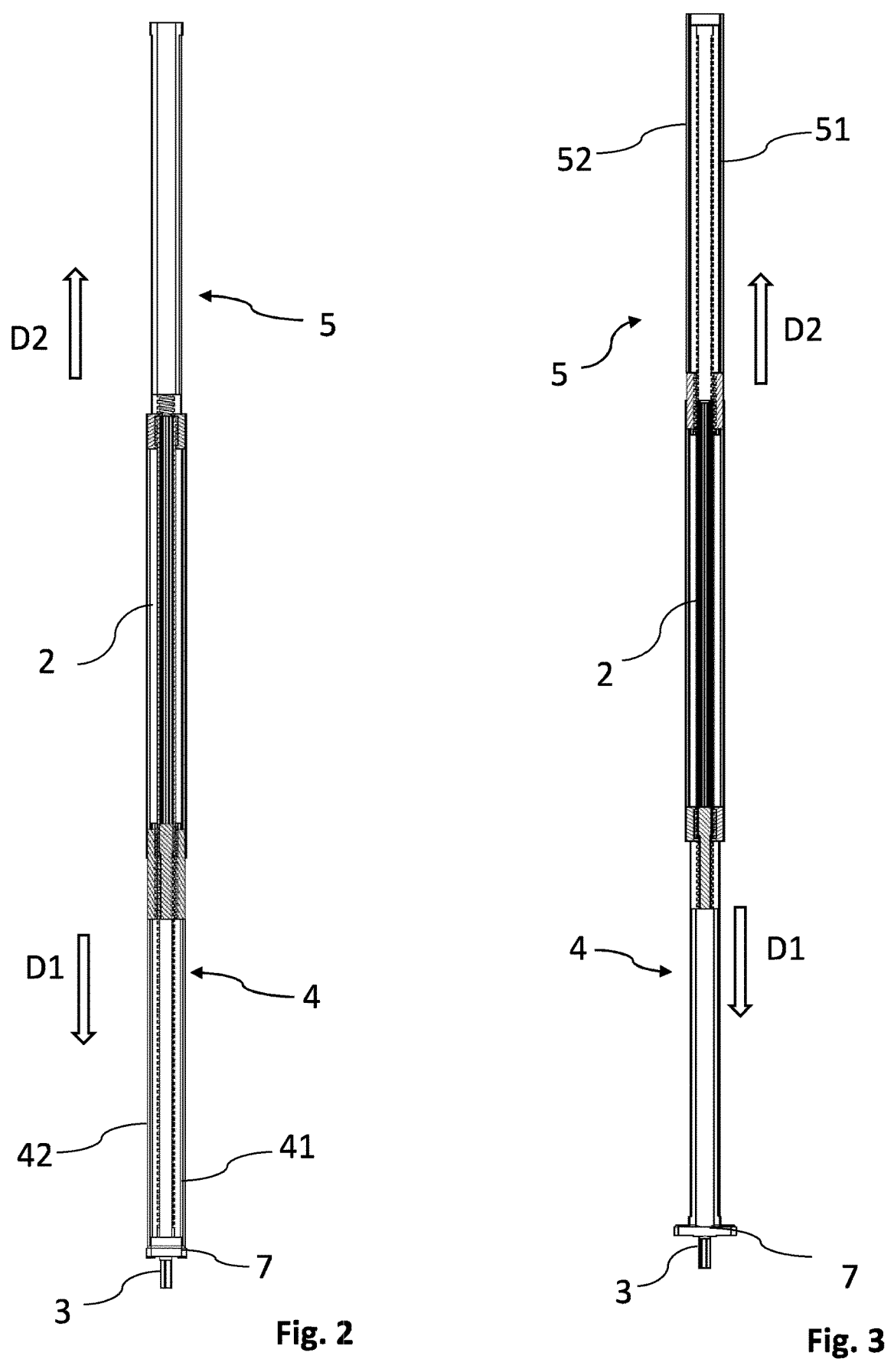

In FIGS. 1, 2 and 3, a linear actuator 1 is illustrated in its most extended state. FIG. 1 shows a perspective view. FIGS. 2 and 3 shows two different views from two mutually perpendicular cross sections along the extension of the linear actuator 1. The linear actuator 1 is movable between said extended state and a contracted state. A right-hand threaded nut member 4 and a left-hand threaded nut members 5 are moved in opposite directions D1 and D2, respectively, during extension of the linear actuator 1, by rotation of a spindle 2 which is explained further below. The spindle 2 is driven by rotation of a driving shaft 3. The circumference of the spindle 2 is engirded by a holding device 6. At one end of the linear actuator there is a plate which may be used for attaching a driving unit for driving the driving shaft 3. The driving shaft 3 may extend through the plate 7.

Figure 4:
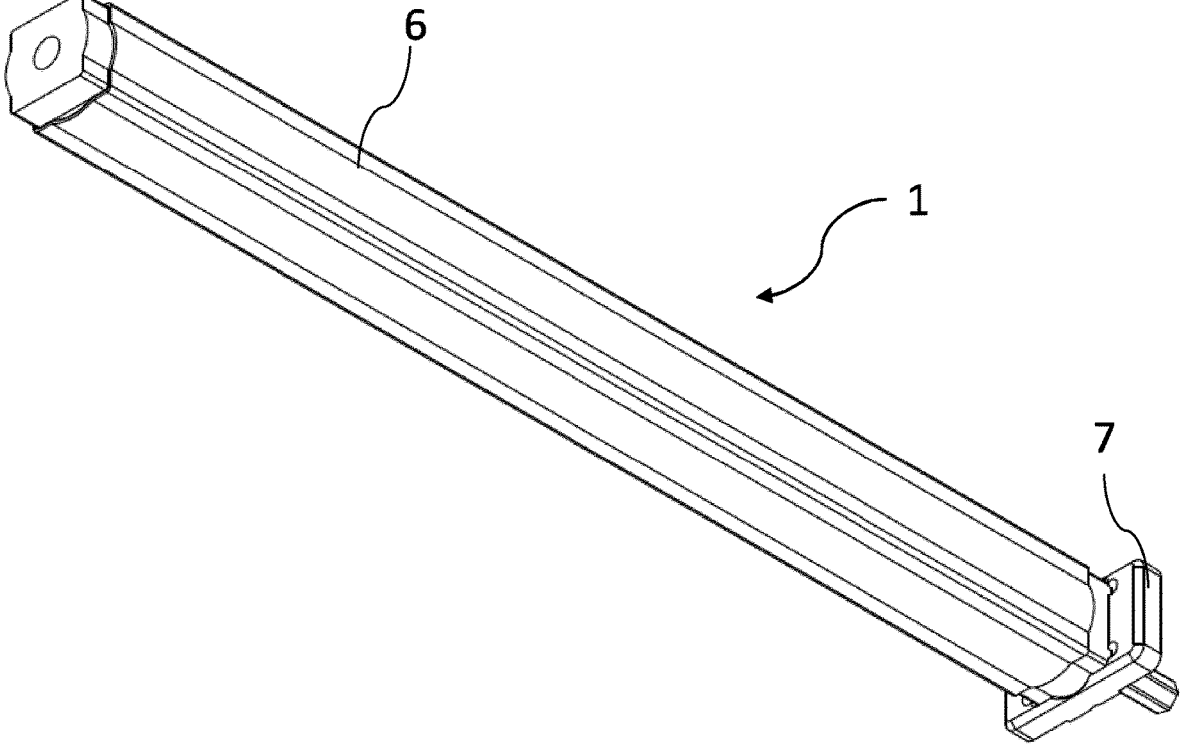
FIG. 4 illustrates a perspective view of a linear actuator in a contracted state according to one embodiment of the invention.
Figure 5:
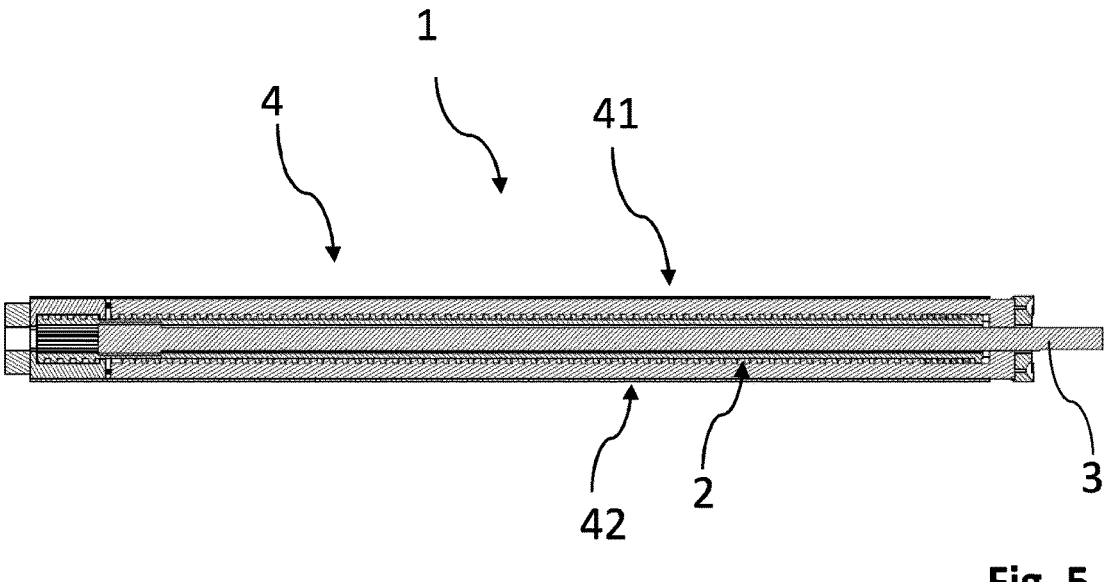
FIG. 5 illustrates a cross-sectional view of a linear actuator in a contracted state according to one embodiment of the invention.
Figure 6:
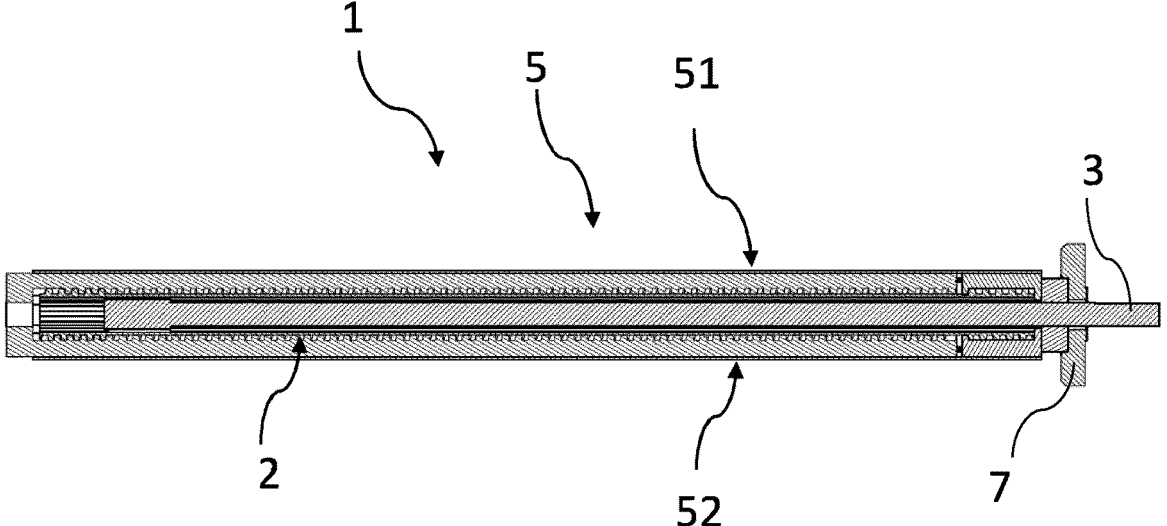
FIG. 6 illustrates a cross-sectional view of a linear actuator in a contracted state according to one embodiment of the invention.

The linear actuator 1 is illustrated in its most contracted state in FIGS. 4, 5 and 6. In FIG. 4 a perspective view is seen. FIG. 5 and FIG. 6 show two mutually perpendicular cross sections corresponding to the cross sections illustrated in FIGS. 2 and 3. In the most contracted state the right-hand threaded nut member 4 and the left-hand threaded nut member 5 extend, at least to a large extent, along the same portion of the longitudinal extension of the linear actuator 1 and within the holding device 6. The left-hand threaded nut member 5 and right-hand threaded nut member 4 partly extend within the holding device for some intermediate states between the contracted and extended states and partly along the same portion of the extension of the linear actuator 1.

Figure 7:
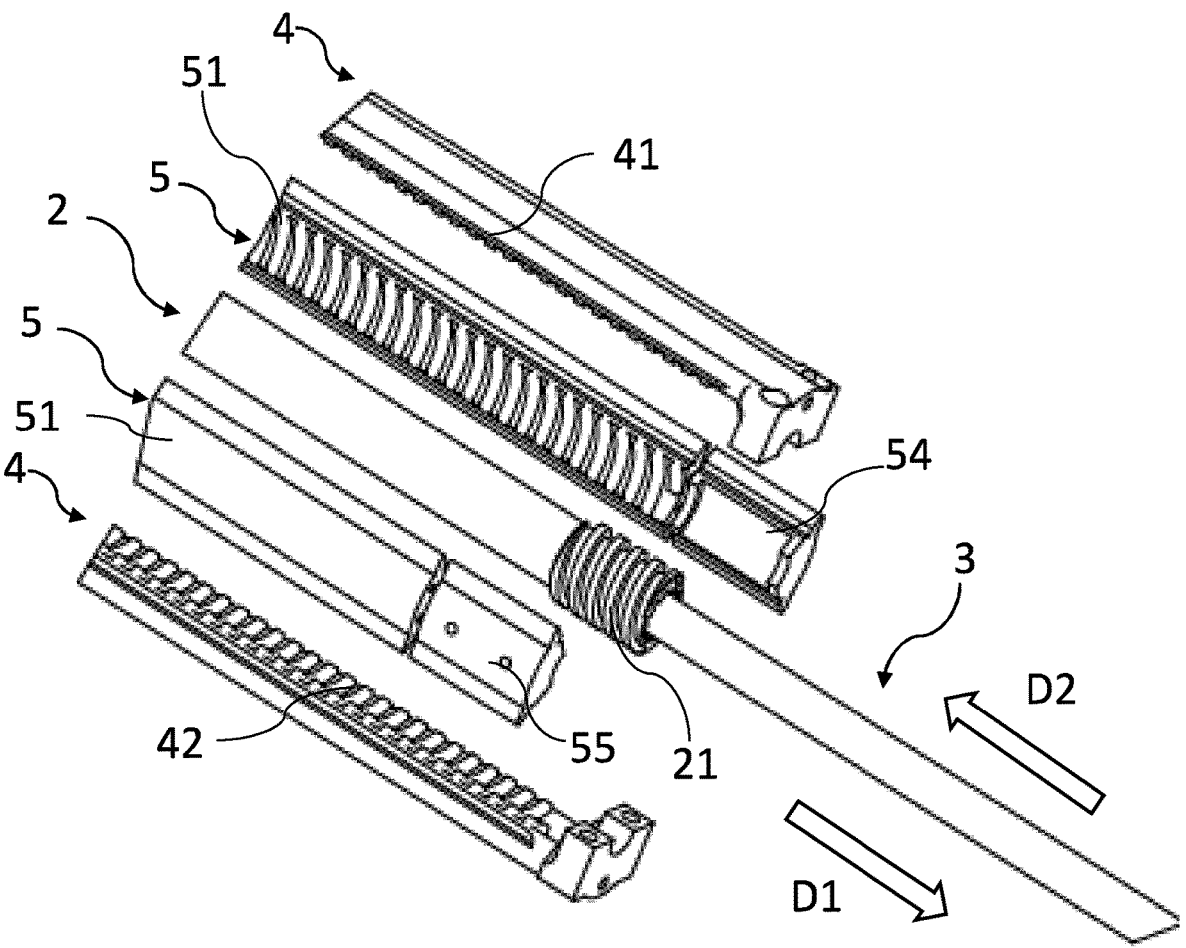
FIG. 7 illustrates a collapsed view of a linear actuator according to one embodiment of the invention.
Figure 8:
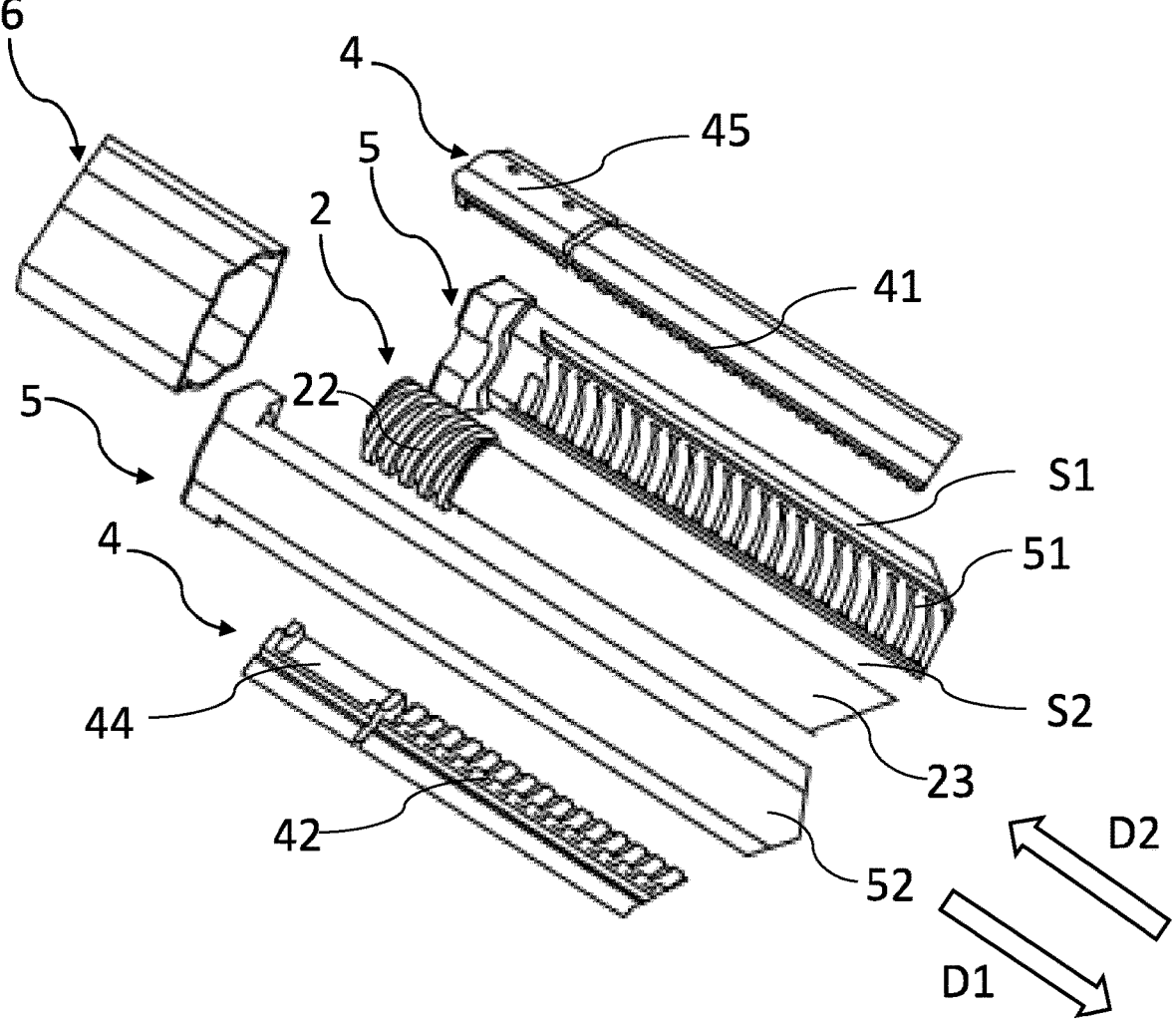
FIG. 8 illustrates a collapsed view of a linear actuator according to one embodiment of the invention.

Several of the parts of the linear actuator 1 are seen in a more detailed view at two different portions of the linear actuator along its longitudinal extension in FIGS. 7 and 8. The spindle 2 is hollow and provided with an opening extending through its longitudinal extension. The spindle 2 is driven by the rotation of the driving shaft 3. The driving shaft 3 is inserted in the opening. The driving shaft 3 is axially movable relative the spindle 2 along its longitudinal extension but rotationally fixed relative the spindle 2 since the cross-sectional shape of the driving shaft 3 matches the shape and size of the opening. For instance, a larger portion of the driving shaft 3 may extend within the hole when the linear actuator 1 is in a more contracted state than in a more extended state. The spindle 2 comprises a right-hand threaded portion 21 at one end of the spindle 2, e.g. the end where the driving shaft 3 is inserted. The right-hand threaded portion 21 is configured to be in threaded contact with the right-hand threaded nut member 4 and so drive the right-hand threaded nut member 4 in a longitudinal direction, dependent on the direction of rotation. Likewise, the spindle 2 has a left-hand threaded portion 22 at the other end of the spindle 2. The left-hand threaded portion 22 is configured to be in threaded contact with the left-hand threaded nut member 5 and so drive the left-hand threaded nut member 5 in a longitudinal direction opposite the direction of the right-hand threaded nut member 4. When the spindle 2 is rotated, the right-hand and left-hand threaded nut members 4, 5 thereby move in opposite linear directions. During extension the right-hand threaded nut member 4 moves in the direction D1 and the left-hand threaded nut member 5 moves in the direction D2 and vice versa during contraction.

Between the right-hand thread portion 21 and the left-hand threaded portion 22 there is a non-threaded portion 23 of the spindle 2. The non-threaded portion 23 enables the linear actuator 1 to reach its most contracted state without a thread 21, 22 of the spindle 2 comes into contact with an opposite threaded nut member 4, 5.

The right-hand threaded nut member 4 has a first part 41 and a second part 42 on two opposite radial sides of the spindle 2, i.e. opposite sides along the circumference of the spindle 2. The left-hand thread nut member 5, likewise, has a first part 51 and a second part 52 on opposite sides of the spindle 2. At one end of the right-hand threaded nut member 4, the first 41 and second parts 42 of said right-hand threaded nut member 4 comprise non-threaded portions 44, 45 which in the most contracted state of the linear actuator 1 are located adjacent to the left-hand threaded portion 22 of the spindle on two opposing (radial) sides thereof. Likewise, the left-hand nut member parts comprise non-threaded portions 54, 55 which are adjacent to the right-hand thread 21 of the spindle 2 in the most contracted state of the linear actuator 1, on two opposing (radial) sides thereof. In more extended states of the linear actuator 1, the non-threaded portions 44, 45, 54, 55 of the right-hand threaded nut member 4 and the left-hand threaded nut member 5 are located at least partly on longitudinally sides in directions D1 and D2, respectively, thereof. The non-threaded portions 44, 45, 54, 55 prevent the movement of threads 21, 22 of the spindle 2 to be disturbed by an oppositely threaded nut member 4, 5.

The first and the second parts 41, 42 of the right-hand nut member 4 are attached to each other at one end of the right-hand nut member which is located at the longitudinal side in the direction D1 of the spindle 2. Likewise, the first and the second parts 51, 52 of the left-hand nut member 5 are attached at one end of the left-hand nut member 5 which is located at the longitudinal side, in the direction D2, of the spindle 2. The first and second parts of a nut member are thereby attached to each other on the opposite side relative its non-threaded portion.

The first 41 and second part 42 of the right-hand threaded nut member 4 comprise opening portions which together form an opening for the driving shaft 3 where said first and second part are attached to each other.

Likewise the first 51 and second part 52 of the left-hand threaded nut member 5 comprise opening portions which together form an opening for the driving shaft 3 where said first and second part are attached to each other. The driving shaft 3 can rotate freely relative to the nut members 4, 5. In one embodiment, at least one of the openings in the nut members 4, 5 for the driving shaft 3 may function as a bearing for the driving shaft 3.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A linear actuator for height adjustable columns comprising a threaded spindle with a longitudinal extension along a longitudinal axis, the spindle being adapted to be rotated by a driving shaft, wherein the spindle is provided with a right-hand thread at a first portion of the longitudinal extension and a left-hand thread at a second portion of the longitudinal extension, the linear actuator further comprising:

a right-hand threaded nut member in threaded connection with the right-hand thread of the spindle; and
 a left-hand threaded nut member in threaded connection with the left-hand thread of the spindle;
 wherein the right-hand threaded nut member comprises a first and a second part configured to be in threaded connection with the spindle on opposing sides along the circumference of the spindle;
wherein the left-hand threaded nut member comprises a first and a second part configured to be in threaded connection with the spindle on opposing sides along the circumference of the spindle;
 wherein, in at least a contracted state of the linear actuator, the right-hand threaded nut member and the left-hand threaded nut member extend along the same portion of the longitudinal extension of the spindle; and
 wherein the threaded connection of the right-hand and left-hand threaded nut member to the spindle provides opposite linear movement of the right-hand threaded nut member relative the left-hand threaded nut member along the longitudinal axis when the spindle is rotated.

2. The linear actuator according to claim 1, wherein the first part of the right-hand threaded nut member and the first part of the left-hand threaded nut member are displaced 85-95 degrees, preferably 90 degrees along the circumference of the spindle and wherein the second part of the right-hand threaded nut member and the second part of the left-hand threaded nut member are displaced 85-95 degrees, preferably 90 degrees along the circumference of the spindle.

3. The linear actuator according to claim 1, wherein the right-hand thread and the left-hand thread of the spindle are separated along the longitudinal extension of the spindle.

4. The linear actuator according to claim 1, wherein the right-hand thread and the left-hand thread are provided at opposite ends of the longitudinal extension of the spindle.

5. The linear actuator according to claim 1, wherein the right-hand threaded nut member bears a first and a second portion of the circumference of the spindle and the left-hand threaded nut member bears a third and a fourth portion of the circumference of the spindle.

6. The linear actuator according to claim 5, wherein the right-hand threaded nut member and the left-hand threaded nut member together bear against substantially the whole circumference of the spindle.

7. The linear actuator according to claim 1, wherein the spindle has a longitudinal hole extending through the spindle and the linear actuator further comprises a driving shaft configured to rotate the spindle, wherein the longitudinal hole and the driving shaft are sized and shaped such that a rotation of the driving shaft provides a rotation of the spindle at the same time as the driving shaft is axially moveable relative the spindle along the longitudinal extension of the spindle.

8. The linear actuator according to claim 1, wherein the first and second parts of the right-hand threaded nut member are configured to be attached to each other at one end and wherein said first and second parts comprise opening portions configured to together form an opening for the driving shaft; and wherein the first and second parts of the left-hand threaded nut member are configured to be attached to each other at one end and wherein said first and second parts comprise opening portions configured to together form an opening for the driving shaft.

9. The linear actuator according to claim 1, wherein the first part and the second part of the right-hand threaded nut member have non-threaded portions which are at least as long as the left-hand threaded portion of the spindle in the longitudinal direction, and the first part and the second part of the left-hand threaded nut member have non-threaded portions which are at least as long as the right-hand threaded portion of the spindle in the longitudinal direction.

10. The linear actuator according to claim 1, further comprising a holding device, wherein the internal shape of the holding device matches the external shape of the right-hand and left-hand threaded nut members and wherein the holding device is arranged to hold the right-hand threaded nut member and the left-hand threaded nut member.

11. The linear actuator according to claim 1, wherein the first parts and the second parts of the nut members are symmetrically distributed along the circumference of the spindle.

12. The linear actuator according to claim 1, wherein the left-hand thread and the right-hand thread of the spindle are separated by a non-threaded portion, and the non-threaded portion extend along at least 50%, at least 70%, or at least 80% of the longitudinal extension of the spindle.

13. A telescopic column comprising at least two telescopic tubes comprising:

a linear actuator according to claim 1;

an inner tube attached to the left-hand threaded nut member; and an outer tube which is attached to the right-hand nut member;

wherein the inner tube and the outer tube are telescopically moveable relative to each other.

\* \* \* \* \*